Patented Apr. 10, 1951

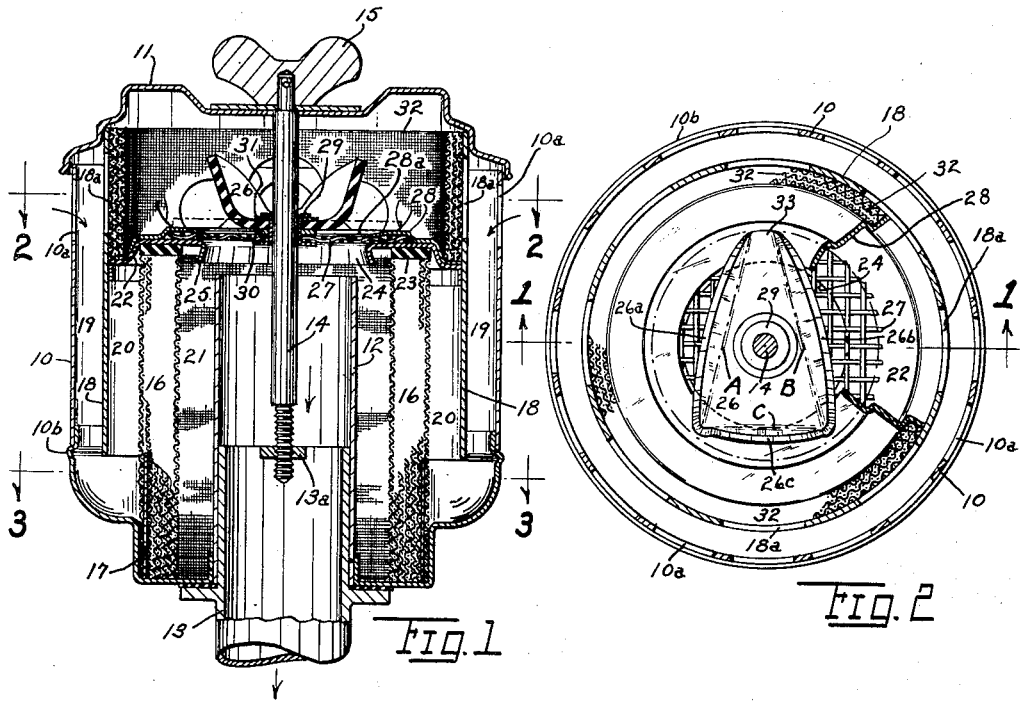
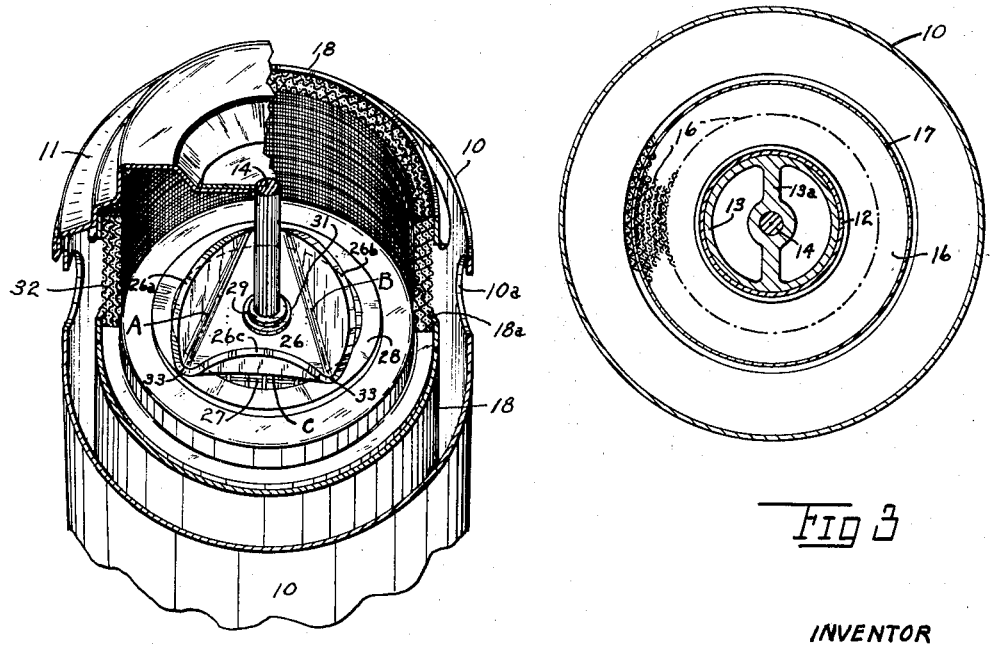

2,548,374

UNITED STATES PATENT OFFICE 2,548,374

RELIEF VALVE

Theodore J. Janson, Cleveland, Ohio, assignor to Air-Maze Corporation, Cleveland, Ohio, a corporation of Delaware Application August 30, 1946, Serial No. 693,863

2 Claims. (Cl. 183—15)

This invention relates to improvements in a filter for cleaning gas or air, and more particularly, to an improvement in means for relieving pressure in such a filter where the flow of the gas stream is reversed.

The present invention has a common application in means for filtering the air stream passing to a compressor or internal combustion engine. Where such a filter is of the liquid washed type commonly referred to as an oil bath filter, the oil or other washing liquid is carried over the filter element during the normal operation of the filter so as to keep the element clean. Under many conditions, some of which are hereinafter explained, there is a sudden flow of the air stream in reverse direction to this normal flow. Such a sudden rush of air in the reverse direction tends to throw the oil or other washing liquid out of the filter at the point where the air stream normally enters, causing a loss of washing liquid, subsequent inefficiency of the filter, and a generally messy condition around the filter. It is an object of the present invention to provide novel means for venting such a reverse flow of the air stream before it can blow the washing liquid out of the filter.

Another object of the present invention is to provide a novel valve for the purpose described which will open and close efficiently thousands of times per minute and which will be very quiet in operation.

Other objects and advantages of the present invention reside in the arrangement of the parts for the efficient performance of their function and other special details of construction, which will appear from the accompanying drawings and description, and the essential features of which will be set forth in the appended claims.

In the drawings,

Fig. 1 is a central sectional view taken along the line 1—1 of Fig. 2;

Fig. 2 is a transverse sectional view taken along the line 2—2 of Fig. 1, with parts broken away to more clearly show the construction;

Fig. 3 is a transverse sectional view taken along the line 3—3 of Fig. 1; while

Fig. 4 is a perspective view looking generally downwardly on the device of Figs. 1 and 2, and with parts broken away to more clearly show the invention in action.

When a liquid bath filter is used to filter the air fed to a compressor, a peculiarly difficult condition occurs when the compressor is of the commonly used "free-air-unloading" type. The compressor is caused to cease pumping air by holding open the compressor inlet valves. This causes a column of air to be sucked into, and to be pushed out of, each cylinder very rapidly as the compressor pistons continue to reciprocate. Each outrush of air is sufficient to blow the liquid out of the filter unless the air pressure is relieved before that can occur. A commonly used portable compressor having two cylinders taking air from a common manifold, running at 1200 R. P. M. and delivering air at about one hundred pounds per square inch will therefore cause air flow reversals at the rate of 2400 per minute. To the best of my knowledge, no valve device known prior to my invention would open and close efficiently at such a high rate of reversal and the best known devices were too noisy. My invention opens and closes efficiently and silently under these difficult conditions.

Other conditions of flow reversal occur in long pipes leading to compressors and internal combustion engines due to a little understood wave action which is set up in the pipes. This columnar action of the compressible fluid in the pipe will cause recurrent flow reversals in a filter positioned at the inlet end of the pipe. My invention is useful in such locations to prevent liquid blowing out of the filter during reversals of normal air flow.

The invention is shown as applied to a liquid bath filter wherein an outer cup-shape housing 10 is provided with a top 11, there being air inlet openings 10a for the admission of a normal stream of air to be filtered. Upstanding from the bottom wall of the cup-shape housing 10 is an outlet pipe 12 which fits on the inlet 13 leading to the air compressor. A spider 13a is threaded to receive the end of a screw 14 having a wing nut 15 by which the screw is tightened to hold the device together and to secure it to the member 13. Between the air inlet and outlet I provide a filter element 16 which may be of known type, made of foraminous material, for instance, it may be made of corrugated screen as taught in Patent No. 2,190,683, granted February 20, 1940, to A. E. Schaaf et al., or as taught in Patent No. 2,190,886, granted February 20, 1940, to A. E. Schaaf et al.; or the filter element may be made of alternate flat and corrugated screen mesh material as taught in Patent No. 1,566,088, granted December 15, 1925, to Oscar V. Greene. The specific form of the filter element forms no part of the present invention, except insofar as it provides a foraminous element adapted to be washed by a liquid such as oil or the like, which fills the housing 10 up to the level of the bead 10b.

To insure the proper washing action, an annular baffle 17 is provided along the lower outside wall of the filter element, and a skirt 18 depends downwardly from the cover to a zone adjacent the oil level so as to define an outer annular chamber 19 where the air is moving downwardly, and an inner annular chamber 20 where the air carries the oil upwardly against the face of the filter element 16 so as to keep the same continuously washed. The clean air passes into the interior chamber 21 and thence out of the filter by way of the pipe 12. A partition wall 22 is secured to the skirt 18 in position to close the top of the chamber 20, and is sealed against the filter element by a gasket 23. This partition is provided with a central opening 24 for a purpose presently to be described, and a flange 25 may be provided around this opening to prevent the carrying of washing liquid out the opening 24 when the normal air stream flow is reversed.

When a compressor is unloaded, or when any reversal of fluid flow occurs, the fluid stream comes rushing out of the pipe 12 in the reverse direction of the arrows shown in Fig. 1, and, if relief were not provided, it would blow outwardly through the annular element 16, causing oil to be carried upwardly through the passageway 19 and outwardly through the openings 10a. A prior device utilized for the purpose of relieving this pressure is shown in Patent No. 2,151,593, granted March 21, 1939, to Clarence J. Glanzer. This device has had some success, but it has been noisy in most cases and has been ineffective in some cases, in that the air stream could not lift the relief valve before a considerable amount of air had passed outwardly through the element 16 so as to blow oil out of the filter, as indicated above. My present invention obviates these difficulties in a novel manner.

Across the opening 24 I provide a flexible circular valve 26 so designed and arranged that the rush of liquid upwardly through the pipe 12 is immediately relieved through the opening 24, and before oil can be carried out of the filter bath. I have found that this flexible valve must be very carefully designed to provide the proper relief of fluid pressure under all circumstances. In the first place, the valve opening must be of sufficient size that the velocity of the fluid escaping therethrough is of the order of five to six times the velocity of the flow through the filter element 16 when in normal use. In the second place, the flexible valve 26 must be of sufficient thickness to provide durability, but it must also be of sufficient flexibility to permit the edges thereof to curl upwardly, as shown in Fig. 4, so as to provide instant relief of air pressure. It must also be of such material and so constructed as to close quietly. It should be remembered that when this device is used in connection with a multi-cylinder compressor, the valve 26 must open and close with every piston stroke of the compressor. This means a tremendous number of cycles occurring in rapid succession when the valve is functioning, and, unless the valve 26 is composed of the proper material and is properly supported, it will not be satisfactory over commercially acceptable periods of time. I find that if the valve 26 is of the order of two to six inches in outside diameter, it will be satisfactory if it is approximately three thirty-seconds of an inch thick and made of a material having the characteristics of an oil resistant synthetic rubber substitute having a test value of fifty on a durometer.

I find that when the valve 26 is of sufficient flexibility to curl upwardly readily, it must be supported across the opening 24 to prevent it being drawn inwardly on suction strokes. To this end, a supporting medium is provided extending across the opening 24. The medium shown is a coarse hardware mesh screen 27 having wires spaced three or four to the inch, although the exact spacing of the supporting wires is immaterial, provided it gives an even support over the entire area and provided it is sufficiently foraminous so as not to appreciably hold back the air flow. The edges of this wire rest on the partition wall 22 around the edges of the opening 24, and the entire screen is held in place by a valve seat member 28 which may be welded to the partition 22, and the screen 27 may be soldered to the partition 22, if desired. The valve seat member 28 has a central circular opening 28a of approximately the same diameter as the opening 24. The upper surface of the plate 28 provides a level seat for the periphery of the valve 26. The center of the valve 26 is perforated to receive the screw 14. The center of the valve may move up and down by small amounts, but I have found it satisfactory to fix the center of valve 26 to screen 27, whose resiliency permits a slight movement of the center of the valve. It is therefore shown held in relatively fixed position by a grommet 29 which passes through the valve 26 and the screen 27, and is flanged radially outwardly, both top and bottom, so as to hold the center of the valve attached to the screen 27. Preferably, a metal washer 30 is provided between the screen and the valve to give a smooth seat against the lower face of the valve. Preferably, also, a flexible washer of rubber or the like, is provided at 31 beneath the upper flange of the grommet 29 so as to cushion the flexing of the valve and prevent the rapid wearing away of the valve against the metal grommet.

When the valve 26 is constructed of the proper material, it will usually act approximately as shown in Figs. 2 and 4, and as shown in full lines in Fig. 1. The closed position of valve 26 is shown in dot-dash lines in Fig. 1. This is its position when air is flowing in the direction of the arrows of Fig. 1. When the air compressor is unloaded and the air rushes outwardly through the valve 26, the entire valve outside the rubber washer 31 is lifted slightly, but the major portion of the air flow is quickly accommodated by the folding upwardly of the edges of the flexible valve 26 somewhat in the manner shown in Figs. 1, 2 and 4. I have found that usually three folds occur, as shown in Figs. 2 and 4, namely, along the lines A, B, and C. The peripheral edge of the valve folds upwardly, as indicated at 26a, 26b, and 26c, respectively. It is difficult to show this clearly in the drawings, but in actual use, these lip portions 26a, 26b, and 26c, turn almost vertically upward. I have found that when the material of valve 26 is properly chosen, the openings uncovered by the upturned lips of the valve are equal to approximately half the area of the valve. Unless considerable area is thus opened up, the action of the valve is slow and more nearly like that of the Glanzer device shown in Patent No. 2,151,593, mentioned above, and such action is insufficient to relieve the air pressure quickly enough to prevent oil blowing out of the filter. In a few cases which I have observed, the flexible valve 26 folds up along two generally parallel lines extending approximately tangentially to the rubber washer 31. In such cases, the area opened up by the two lips is approximately equal to the area opened up by the three lips shown in Figs. 2 and 4.

Another feature which contributes to the success of my invention is the placing of the upper end of pipe 12 a short distance from the opening 24 so that the blast of air upwardly along pipe 12, when flow is reversed, is immediately effective, like a jet, acting upon the valve 26 to cause it to open quickly.

Another novel feature which contributes to the long life of my new device is the attachment of the center of valve 26 by means of grommet 29 to the wire screen 27. This gives a substantially fixed support for valve 26 but one which is not absolutely rigid, because the center of the screen may move slightly with reference to its fixed edges.

Figs. 2 and 4 illustrate the quiet operation of my valve. The node points 33 are never far from the valve seat 28. Therefore, when the valve closes, the lips 26a, 26b and 26c fold down upon the valve seat and the periphery of valve 26 rolls down upon the valve seat beginning at points 33 and extending to the tips of lips 26a, 26b and 26c. This gives a quiet operation not found in the substantially rigid disc valve of the above mentioned Glanzer patent.

The air passing out through valve 26 escapes through generous openings 18a in the upper portion of the skirt 18. A filter element 32 is provided at this point because while the valve 26 is open, the compressor pistons are moving rapidly up and down, and on their suction strokes, a certain amount of air may be drawn inwardly through the openings 18a. The filter element 32 cleans this air which is drawn in.

What I claim is:

1. In a cleaner of the class described having an annular filter element, having a central tubular fluid outlet positioned axially of said element, having a housing forming an annular chamber about said element and forming a liquid bath-receiving sump below said element, there being gaseous fluid inlet means in said housing and above said sump, there being partition means for guiding fluid from said element to said outlet including a wall opposite the end of said tubular outlet, and there being a planar outlet opening through said wall substantially axially aligned with said tubular outlet and substantially at right angles to the axis of said outlet, said outlet opening being substantially unobstructed, the combination of a flexible flat circular valve closing said outlet opening, means holding the central portion of said valve in approximately the plane of said opening leaving the periphery of said valve free, said valve being of material of such flexibility that its peripheral portions are adapted to be bent upwardly by jet action of gaseous fluid in reverse flow through said tubular outlet, and stiff coarse hardware mesh screen fixed across said outlet opening substantially in the plane of said opening and on the side of said valve nearer said tubular outlet.

2. In a cleaner of the class described having an annular filter element, having a central tubular fluid outlet positioned axially of said element, having a housing forming an annular chamber about said element and forming a liquid bath-receiving sump below said element, there being gaseous fluid inlet means in said housing and above said sump, there being partition means for guiding fluid from said element to said outlet including a wall opposite the end of said tubular outlet, and there being a planar outlet opening through said wall substantially axially aligned with said tubular outlet and substantially at right angles to the axis of said outlet, said outlet opening being substantially unobstructed, the combination of a flexible flat circular valve closing said outlet opening, means holding the central portion of said valve in approximately the plane of said opening leaving the periphery of said valve free, said valve being of material of such flexibility that its peripheral portions are adapted to be bent upwardly by jet action of gaseous fluid in reverse flow through said tubular outlet, and stiff coarse foraminous material fixed across said outlet opening substantially in the plane of said opening and on the side of said valve nearer said tubular outlet.

THEODORE J. JANSON.

REFERENCES CITED

The following references are of record in the file of this patent:

UNITED STATES PATENTS

| Number | Name | Date |
| --- | --- | --- |
| 1,927,947 | Newell | Sept. 26, 1933 |
| 2,151,593 | Glanzer | Mar. 21, 1939 |
| 2,312,832 | Goldwater | Mar. 2, 1943 |
| 2,318,236 | Layton | May 4, 1943 |